United States Patent [19]

Mamiya et al.

[11] Patent Number: 5,995,090
[45] Date of Patent: Nov. 30, 1999

[54] FILING APPARATUS

[75] Inventors: Akira Mamiya, Yokohama; Akira Suga, Tokyo, both of Japan

[73] Assignee: Canon Kabushiki Kaisha, Tokyo, Japan

[21] Appl. No.: 08/592,987

[22] Filed: Jan. 29, 1996

[30] Foreign Application Priority Data

Jan. 31, 1995 [JP] Japan .................................. 7-034256

[51] Int. Cl.⁶ .................................................. G06F 17/30
[52] U.S. Cl. ........................................................ 345/302
[58] Field of Search ................... 345/302, 348, 345/435

[56] References Cited

U.S. PATENT DOCUMENTS

| | | | |
|---|---|---|---|
| 5,398,293 | 3/1995 | Sato et al. ........................ | 707/516 X |
| 5,408,599 | 4/1995 | Nomura et al. ................... | 707/516 |
| 5,572,728 | 11/1996 | Tada et al. ........................ | 707/200 |
| 5,581,686 | 12/1996 | Koppolu et al. .................. | 345/340 |
| 5,613,909 | 3/1997 | Stelovsky ......................... | 463/1 |
| 5,640,579 | 6/1997 | Koppolu et al. .................. | 707/526 |
| 5,659,793 | 8/1997 | Escobar et al. ................... | 345/302 |

OTHER PUBLICATIONS

Feldman, CorelDRAW! Now!, pp. 193–195, 200–203, 1993.

*Primary Examiner*—Anton Fetting
*Attorney, Agent, or Firm*—Morgan & Finnegan, L.L.P.

[57] ABSTRACT

There is disclosed a filing apparatus capable of improving the operability and the work efficiency in the fitting, in prepared data, of multi-media data prepared by another application. The word processor sends a request containing a predetermined code and a keyword to the filing apparatus, which judges whether the received code is a predetermined code. If it is the predetermined code, a file containing the keyword is retrieved. Then judged is the number of the retrieved multi-media data, and, if plural multimedia data are retrieved, there is displayed a retrieval image frame for selecting one of the retrieved multi-media data, but, if only one multi-media data is retrieved, it is directly fitted in a word processed text.

25 Claims, 15 Drawing Sheets

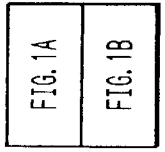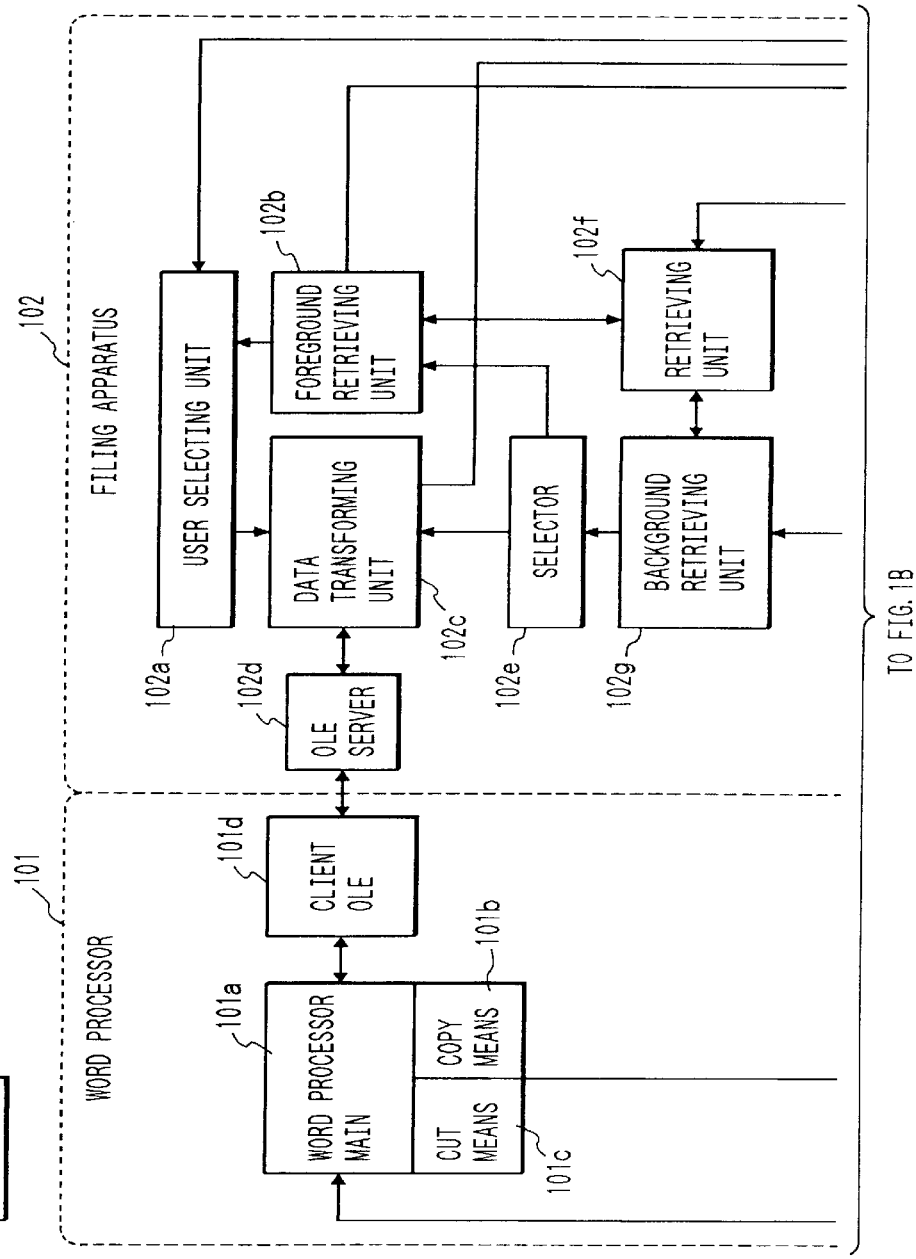

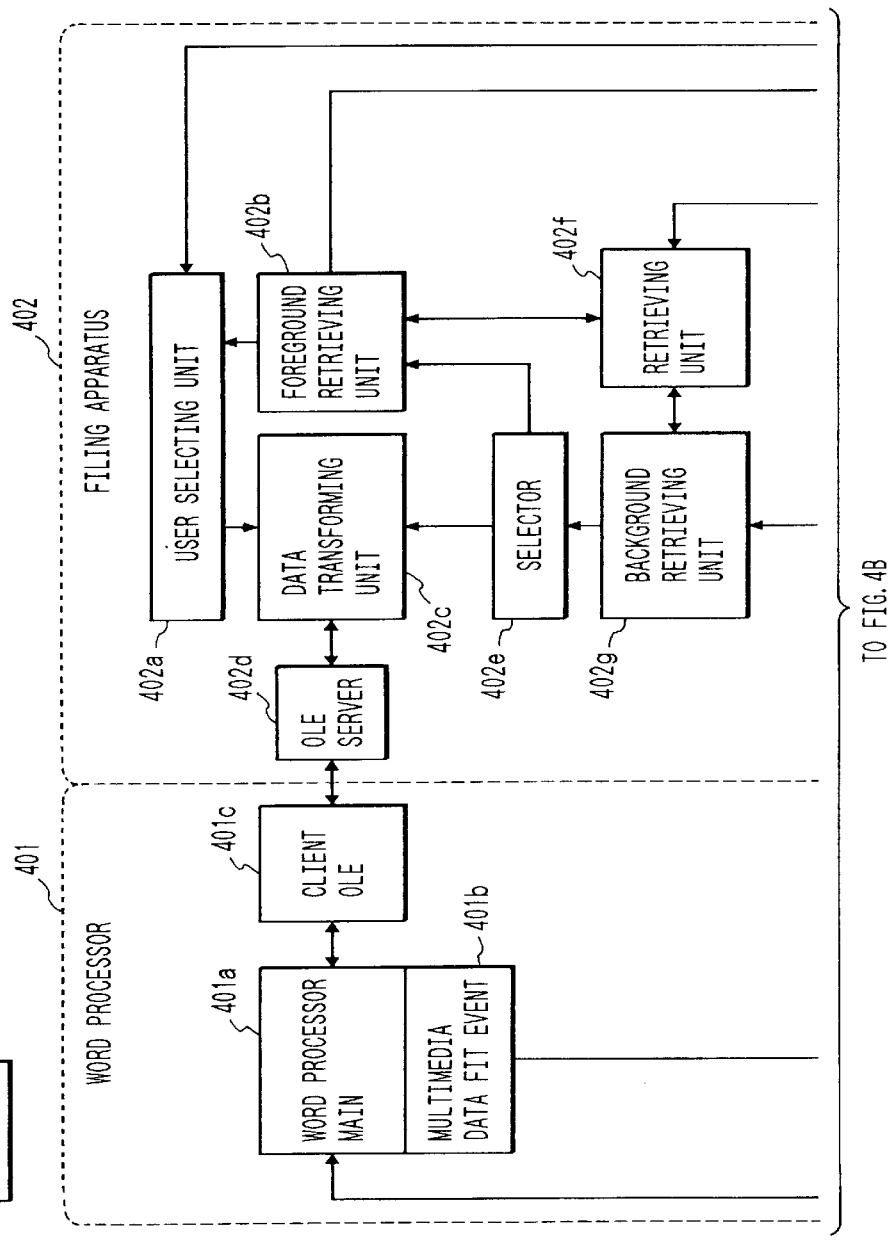

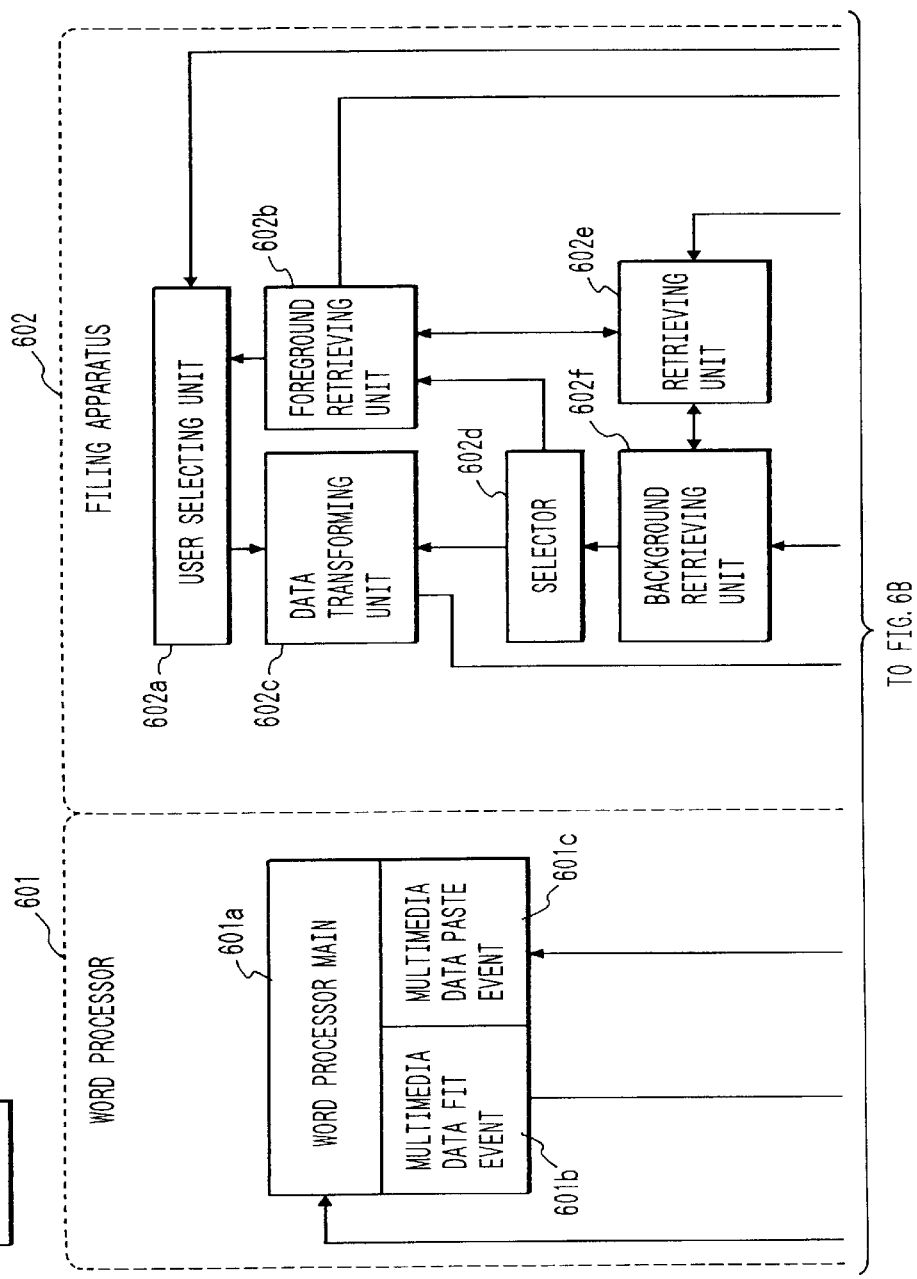

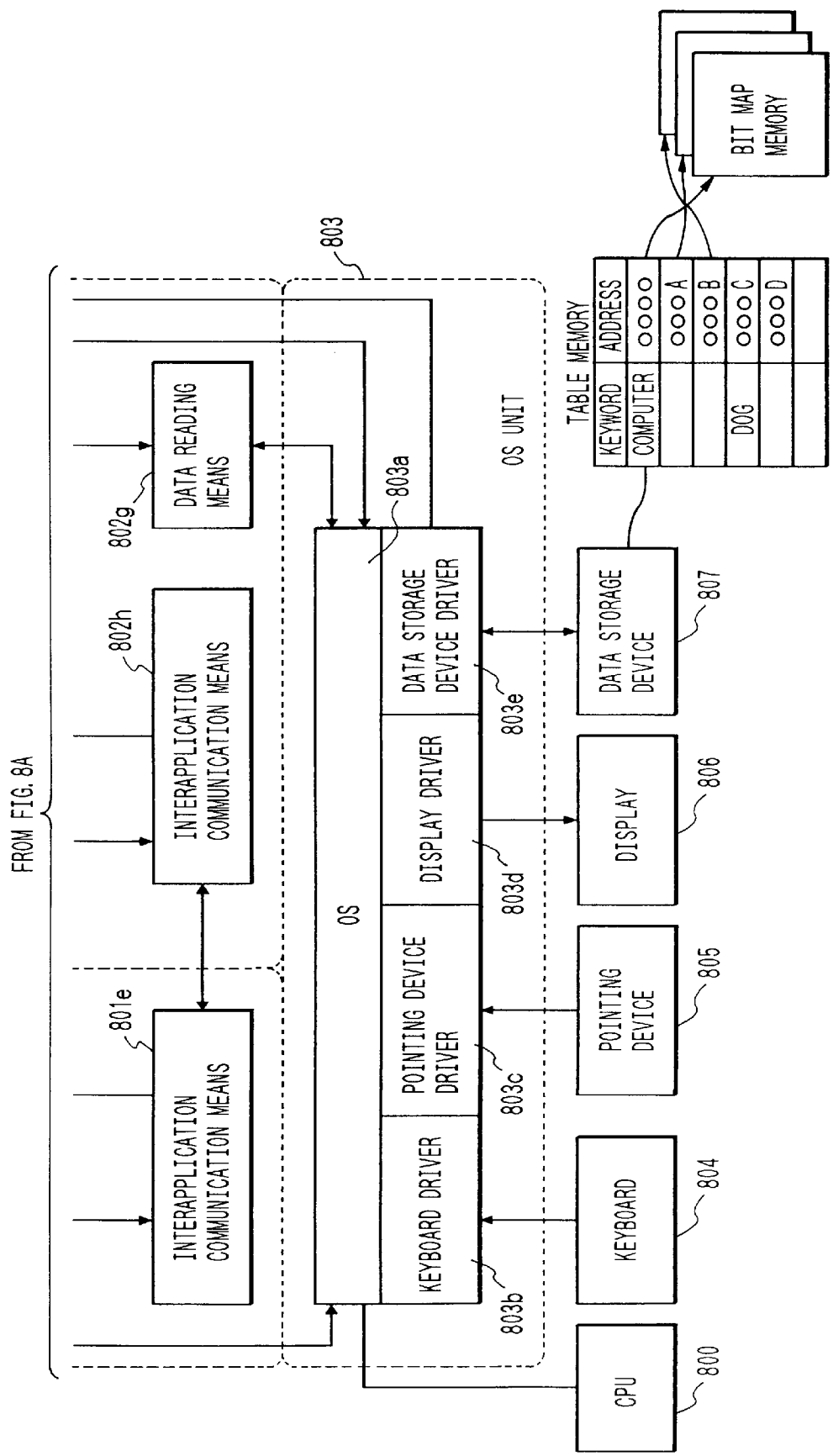

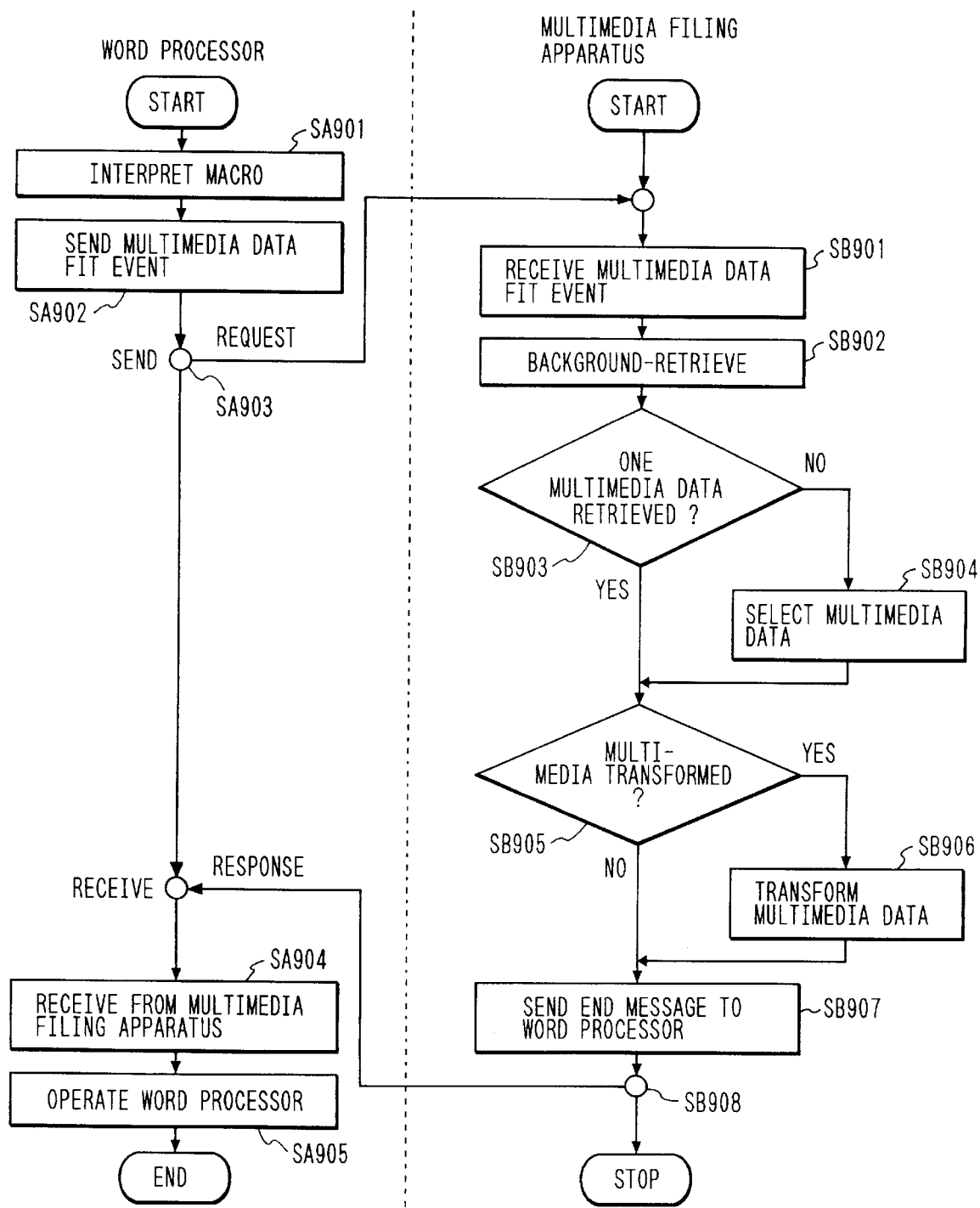

FILING APPARATUS

BACKGROUND OF THE INVENTION

1. Field of the Invention

The present invention relates to a filing apparatus capable of handling multimedia data such as image data, voice data and text data and of simultaneously functioning with a peripheral apparatus such as a word processor, a graphic processor, a text editor or a spread sheet.

2. Related Background Art

Certain text processing apparatus, such as the word processor, are constructed on the personal computers or work stations. In the editing of a text prepared with such text processing apparatus, multi-media data, particularly an image are sometimes fitted into the text.

For example, in the text processing by the Microsoft Word for Windows (trade name of Microsoft) working on Microsoft Windows (trade name of Microsoft), the fitting of the multi-media data into a text is achieved by direct insertion of the multi-media data into the text (copying of an image into the text) or by correlating objects.

In the above-mentioned image copying into the text, in case of erroneous copying a wrong image, it becomes necessary to delete the copied image from the text, to correct the image with a graphic processor or an image retouching software and to copy the image again into the text.

Also in the Microsoft Windows, the correlation of the objects is achieved by OLE (Object Linking and Embedding), which allows to incorporate information, prepared by another application, into the text and to modify the information in the text.

Though OLE function allows to correct the image in a state fitted in a text, the image to be fitted has to be selected and designated by a file name. If plural files are present as candidates for the selection of the image to be fitted, it becomes necessary to designate a file name containing desired multi-media data from such plural files, to read the desired multi-media data from the designated file and to fit the multi-media data into the text.

In such selecting operation, the user is required to estimate the content of the file from the file name and to designate a file estimated to contain the required multi-media data. If the designated file does not contain the multi-media data intended by the user, the user is required to again effect the file selecting operation, which is repeated until the anticipated multi-media data are found. Such procedure is not convenient and is poor in efficiency.

SUMMARY OF THE INVENTION

An object of the present invention is to provide a filing apparatus capable of improving the operability and the work efficiency in the selection of multi-media data.

Another object of the present invention is to provide a filing apparatus capable of achieving improvement both in the process speed and the operability in the fitting of multi-media data, stored in the filing apparatus, into other data.

The foregoing objects can be attained, according to a preferred embodiment of the present invention, by a filing apparatus for processing multi-media data, comprising retrieval means for retrieving multi-media data containing information coinciding with input information of a keyword, and process means for displaying a retrieval image frame for use in the retrieval by the retrieval means or releasing the multi-media data retrieved by the retrieval means, according to the result of retrieval by the retrieval means.

Still another object of the present invention is to provide a filing apparatus capable of improving the function at the retrieval of the stored multi-media data.

Still another object of the present invention is to provide a filing apparatus with novel functions.

Still other objects of the present invention, and the features thereof, will become fully apparent from the detailed description of the preferred embodiments, to be taken in conjunction with the attached drawings.

BRIEF DESCRIPTION OF THE DRAWINGS

FIG. 9 is a flow chart showing the control sequence in the filing apparatus shown in FIGS. 8A and 8B.

DESCRIPTION OF THE PREFERRED EMBODIMENTS

Now the present invention will be clarified in detail by preferred embodiments thereof shown in the attached drawings.

[First Embodiment]

Figure 1B:
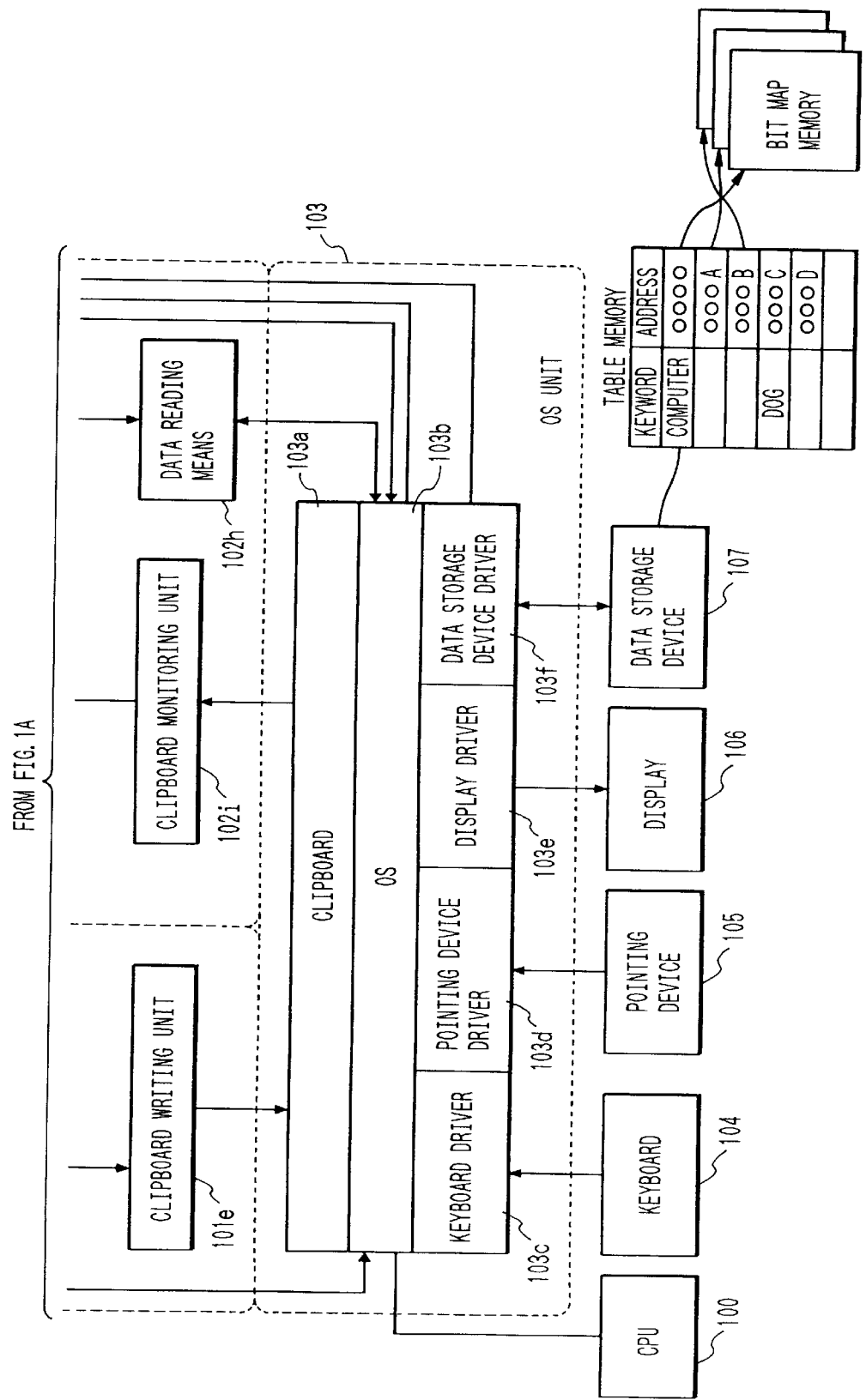
FIG. 1 which is composed of FIGS. 1A and 1B is a block diagram showing the configuration of a filing apparatus constituting a first embodiment of the present invention and a peripheral apparatus such as a word processor connected thereto.

FIGS. 1A and 1B are block diagrams showing the configuration of a filing apparatus constituting a first embodiment of the present invention and a peripheral apparatus such as a word processor connected thereto. The filing apparatus and the word processor mentioned above are constructed by softwares functioning on an operating system, but the functions of these softwares are graphically represented in the form of a block diagram, for the ease of the following description. The filing apparatus 102 of the present embodiment is connected to a word processor 101 and an OS (operating system) unit 103, and the operations of the entire apparatus are controlled by a CPU 100.

The word processor 101 is provided with a word processor main unit 101a, copy means 101b, cut means 101c, an OLE client 101d, and a clipboard writing unit 101e. The word processor 101 is formed by a software such as Microsoft Word for Windows, WordPerfect for Windows (trade name of Word Perfect Inc.) or AmiPro (trade name of Lotus, Inc.) and operates on the OS unit 103. A character input from a keyboard 104 is processed by the word processor main unit 101a and written into a clipboard 103a to be explained later.

The filing apparatus 102 is provided with a user selection unit 102a, a foreground retrieving unit 102b, a data transforming unit 102c, an OLE server 102d, a selector 102e, a retrieving unit 102f, a background retrieving unit 102g, a data reading unit 102h and a clipboard monitoring unit 102i.

The OS unit 103 is provided with a clipboard 103a, an OS 103b, a keyboard driver 103c, a pointing device driver 103d, a display driver 103e and a data storage (memory) driver 103f.

The word processor main unit 101a of the word processor 101 has a text preparing function, under the control of a keyboard 104.

The copying means 101b has a function, in response to a copying instruction from the keyboard 104 or the pointing device 105, of copying data to be copied to the clipboard 103a (a shared memory provided for example by the OS).

The cutting means 101c has a function, in response to a cutting instruction from the keyboard 104 or the pointing device 105, of writing data to be cut including the data to be copied, into the clipboard 103a and deleting the above-mentioned data from the memory of the application.

The OLE client 101d is composed of means for calling, from a fitted object, an application for managing such object. The application in the present embodiment is an image processing application, as the object mentioned hereinafter is an image composed of multi-media data. The content of the process is informed to the data transforming unit to be explained later, and such content is entered by the keyboard 104 or the pointing device 105a. The details of this process will be not explained further, as they are described in the manual of the Microsoft Word for Windows.

The clipboard writing unit 101e is composed of means for writing the data, obtained through the cutting means 101c or the copying means 101b into the clipboard 103a.

The user selection unit 102a of the filing apparatus 102 receives the selection of the user by the pointing device 105 on the retrieving image frame, displayed on a display 106 according to the data of the clipboard 103 to be explained later, and sends a signal to the data transforming unit 102c. Also, on the selected multi-media data, it provides the data transforming unit with an instruction for editing (for example, an area designation for the multi-media data displayed on the display 106, or an area cutout, a trimming, an instruction for image reduction or enlargement or an image reduction or enlargement with a designated magnification in the designated area).

The foreground retrieving unit 102b is composed of means for requesting plural multi-media data to the retrieval unit 102f, obtaining the requested data from the data memory device 107 through the OS unit and displaying them on the display 106.

The data transforming unit 102c is composed of means for effecting, in response to the input of the aforementioned process content, a partial cutout of the retrieved multi-media data, a trimming of the image data, or an image reduction or an image enlargement.

The OLE server 102d receives an event transmitted from the OLE client 101d, and, in the present embodiment, thereby activates the filing apparatus or informs the data transforming unit 102c of the event.

The selector 102e is composed of means for judging whether one or plural multi-media data have been retrieved by the background retrieving unit 102g, and, in case only one multi-media data is retrieved, sends the retrieved multi-media data to the data transforming unit 102c, but, in case plural multi-media data are retrieved, sends a signal indicating this fact to the foreground retrieving unit 102b.

The retrieving unit 102f is composed of means for requesting, to the data reading means 102h, the retrieval of a file matching the keyword.

The background retrieving unit 102g is composed of means of sending, to the retrieving unit 102f, a request for retrieval on a keyword obtained from the clipboard 103a without display.

The clipboard monitoring unit 102i is composed of means for monitoring the data entering the clipboard 103a and, upon finding a special code for calling the filing apparatus 102, sending a keyword, following the above-mentioned code, to the background retrieving unit 102g.

The clipboard 103a of the OS unit 103 effects data writing in and reading from each application, such as the word processor or the filing apparatus, in a memory area provided by the OS 103b. The OS 103b is composed of means for managing the clipboard and the device drivers, and the applications operate on this means.

The keyboard driver 103c is composed of means for operating the keyboard 104, and the pointing device driver 103d is composed of means for operating the pointing device 105. Also, the display driver 103e is composed of means for operating the display 106, and the data memory device driver 103f is composed of means for operating the data memory device 107.

The keyboard 104 is used for data input in the word processor. The pointing device 105, composed of a mouse, a pen or a tablet, constitute designation means in selecting the multi-media data on the retrieving image frame to be explained later. The display 106 is composed of means for displaying multi-media data and text prepared by the word processor, composed for example of a cathode ray tube or a liquid crystal display device such as a TFT LCD or FLCD. The data memory device 107 employs a memory medium such as a hard disk, a magnetooptical disk or a floppy disk and is provided inside or outside the OS unit 103. The device 107 includes a bit map memory storing the multi-media data, addresses for the above-mentioned bit map memory, and table addresses for correlating the keyword.

Figure 2A:
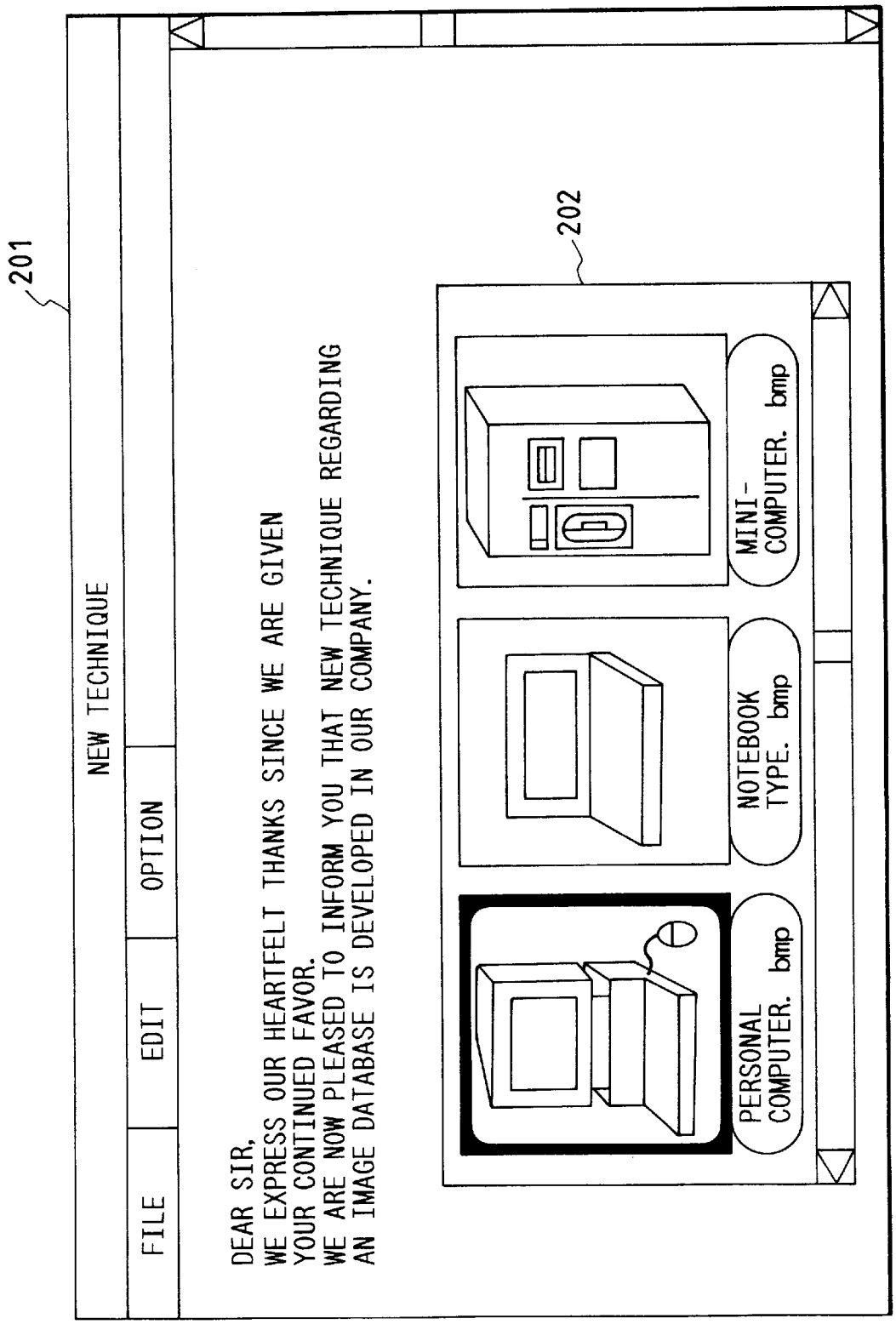
FIGS. 2A and 2B are views showing examples of the retrieval image frame of a word processor, generated in the filing apparatus shown in FIGS. 1A and 1B.
Figure 2B:
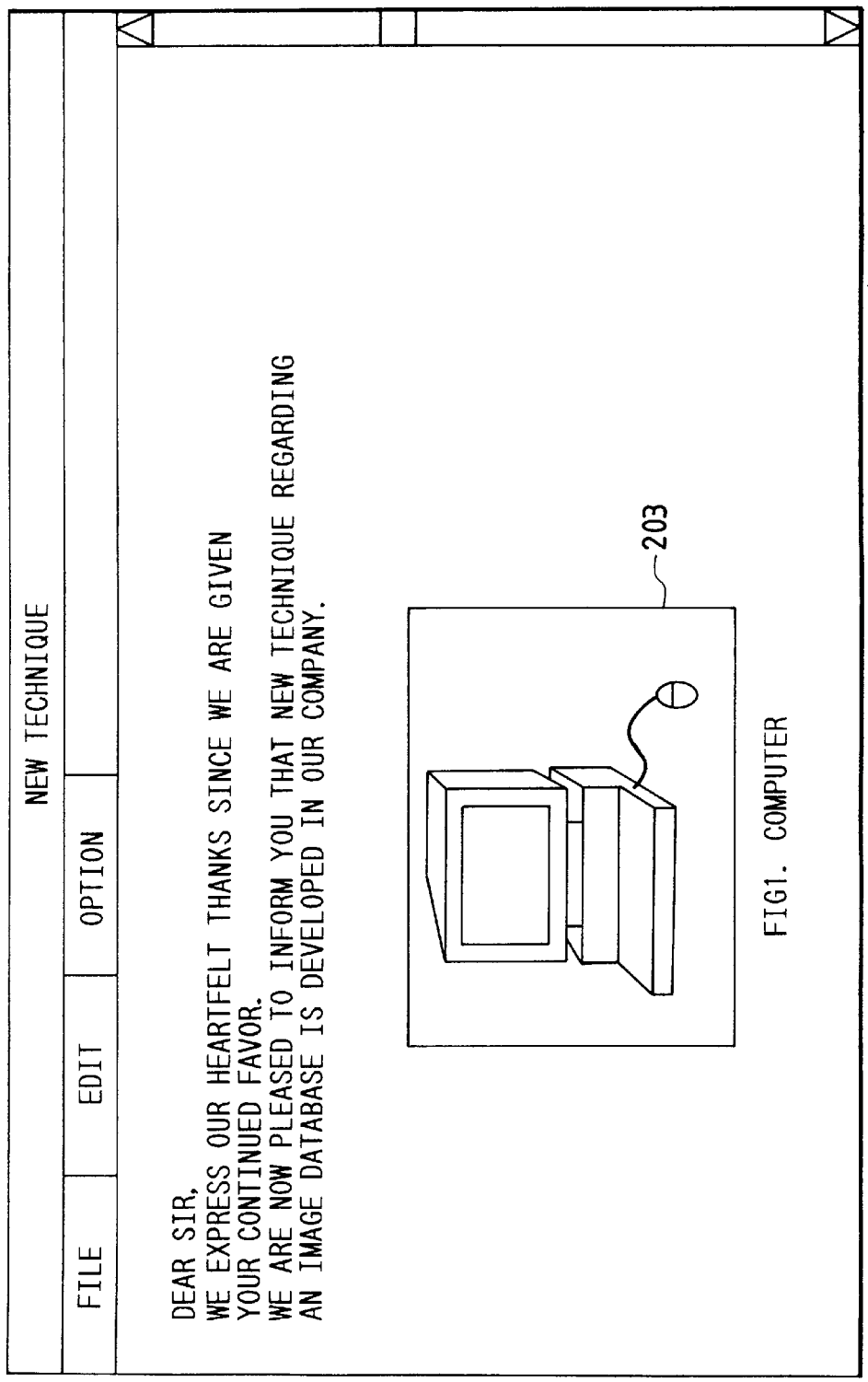
Figure 3:
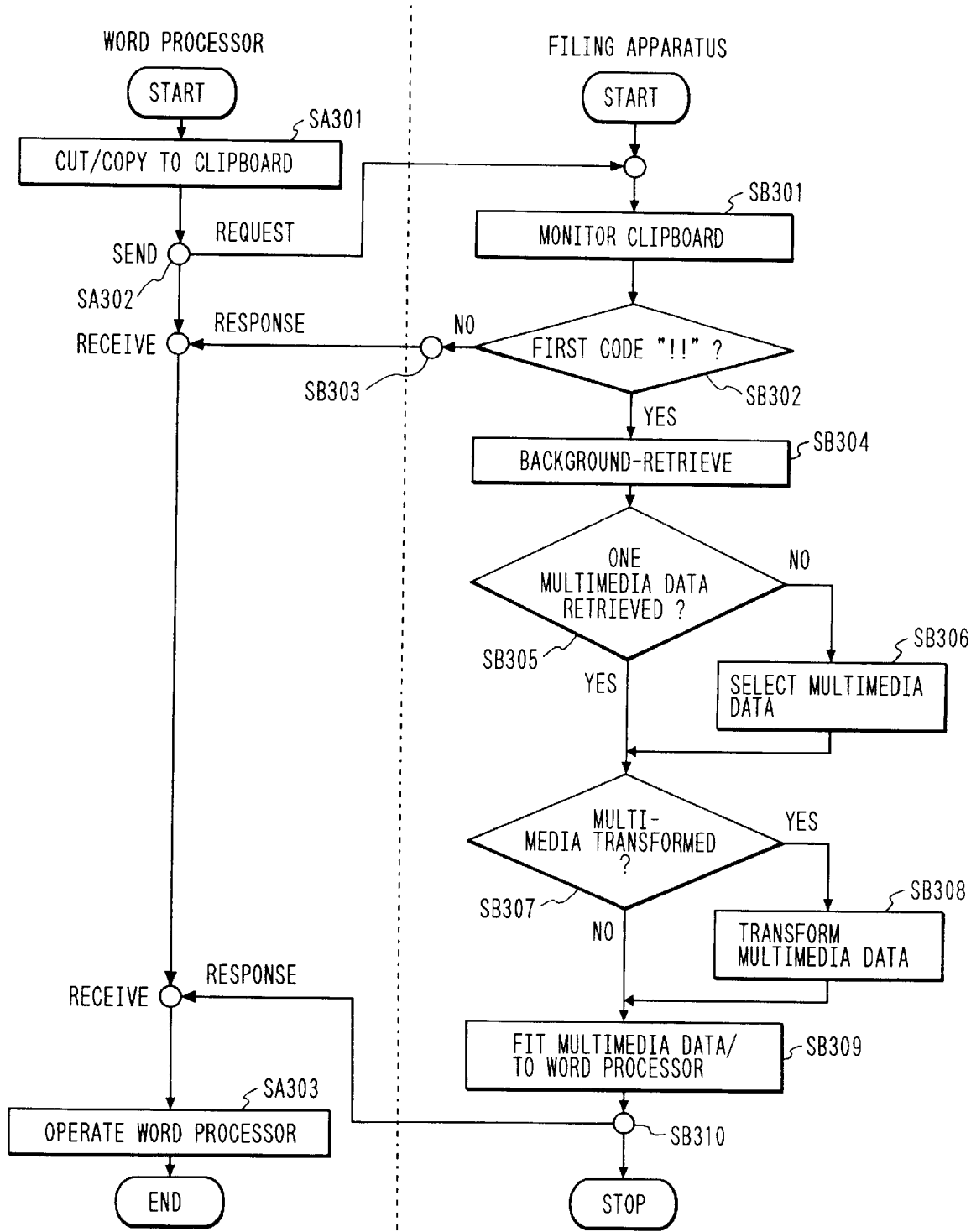
FIG. 3 is a flow chart showing the control sequence in the filing apparatus shown in FIGS. 1A and 1B.

In the following, there will be explained the operations of the filing apparatus of the present embodiment, with reference to the attached drawings. FIGS. 2A and 2B are views showing examples of retrieval in the word processor generated by the filing apparatus shown in FIGS. 1A and 1B, and FIG. 3 is a flow chart showing the control sequence in the word processor and the filing apparatus shown in FIGS. 1A and 1B.

In the following, there will be explained a sequence of fitting multi-media data, prepared by the filing apparatus, into a text prepared by the word processor 101, with reference to a flow chart in FIG. 3.

At first, in a text prepared by the word processor 101 and displayed on the display 106, there is designated a position, by the pointing device 105, for writing the multi-media data.

Then, the keyboard 104 is used to enter a predetermined code "!!" for activating the filing apparatus (program), followed by a keyword.

The above-mentioned code "!!" may be replaced by any other code, such as "YY" or "$$", that is rarely used in the word processor.

The entered code and keyword are cut or copied by the cutting means 101c or the copying means 101b, and written into the clipboard 103a through the clipboard writing unit 101e (step SA301).

This code constitutes a request, from the word processor 101 to the filing apparatus 102, for multi-media data corresponding to the keyword (step SA302).

The clipboard monitoring unit 102i monitors constantly the codes written into the clipboard and discriminates whether each written code is the above-mentioned predetermined code (SB301). In case it identifies that the written code is not the predetermined code, it returns an NG response to the word processor, identifying that the file apparatus 102 is not requesting multi-media data (SB302, SB303).

On the other hand, upon detection of the predetermined code, the clipboard monitoring unit 102i acquires a keyword, following the predetermined code, from the clipboard 103a and informs the background retrieving unit 102g of the keyword.

The background retrieving unit 102g sends, to the retrieving unit 102f, a request for the multi-media data corresponding to the keyword.

The retrieving unit 102f makes access to a table memory in the data memory device 107 through the data reading means 102h and the OS, and acquires information on the kind of the multi-media data corresponding to the keyword (SB304).

The information on the kind of the multi-media data, obtained from the retrieving unit 102f, is sent to the background retrieving unit 102g, for discriminating whether there is only one file or there is a plurality of files (SB305).

In case plural multi-media data are obtained by the retrieval, there is displayed, on the display 106, a retrieving image frame for selecting predetermined multi-media data among such plural data, and the user selects the predetermined multi-media data by using the pointing device on the above-mentioned retrieving image frame displayed on the display 106 (step SB306). On this retrieving image frame, the multi-media data are reduced in size and synthesized into a multi-window display.

This retrieving image frame 201 is displayed, as shown in FIG. 2A, in a superimposed manner with the text of the word processor 101, and includes the retrieved plural multi-media data 202 (in the illustrated example, images stored in the bit map memory and corresponding to a keyword "computer"). By a clicking operation to one of the displayed plural multi-media data, the clicked data is selected for fitting and the periphery of the displayed data varies to highlight display. The display mode responding to the clicking operation is not limited to such highlight display but can be, for example, a change in color or an inversion of the image.

In case only one multi-media data is obtained in the retrieval, the retrieved image 203 is fitted, as shown in FIG. 2B, into the designated position in the text prepared by the word processor.

In case only one multi-media data is obtained in the retrieval, or after the selection of the predetermined multi-media data from the retrieved plural multi-media data, the data transforming unit 102c effects judgment on the presence or absence of transformation on the multi-media data and on the content of such transformation process (step SB307).

In the present embodiment, as the retrieved data is linked by the OLE between the word processor and the filing apparatus, the multi-media data can be edited prior to the fitting into the text prepared by the word processor.

The multi-media data can naturally be edited also after fitting, on the word processing software.

The transformation process on the multi-media data is executed with the designated content (step SB308), such as enlargement, reduction, partial cutout or trimming.

After the transformation process on the multi-media data, or if the transformation process is not executed on the multi-media data, the transfer of the fitting and processing of the predetermined multi-media data to the word processor 101 is advised by a response thereto through the OLE (steps SB309, SB310). After the transmission of the response, the filing apparatus 102 completes the process therein and terminates the function. In this terminated state, the filing apparatus 102 is in an idle state of the process in the background, and can execute a request from the word processor 101 as a foreground process.

After the above-mentioned response, the operation on the keyboard 104 or the pointing device 105 serves to operate the word processor 101 (step SA303).

Through the above-explained process, there can be achieved improvement in the operability and in the work efficiency in the fitting of the multi-media data into the prepared data.

[Second Embodiment]

Figure 4B:
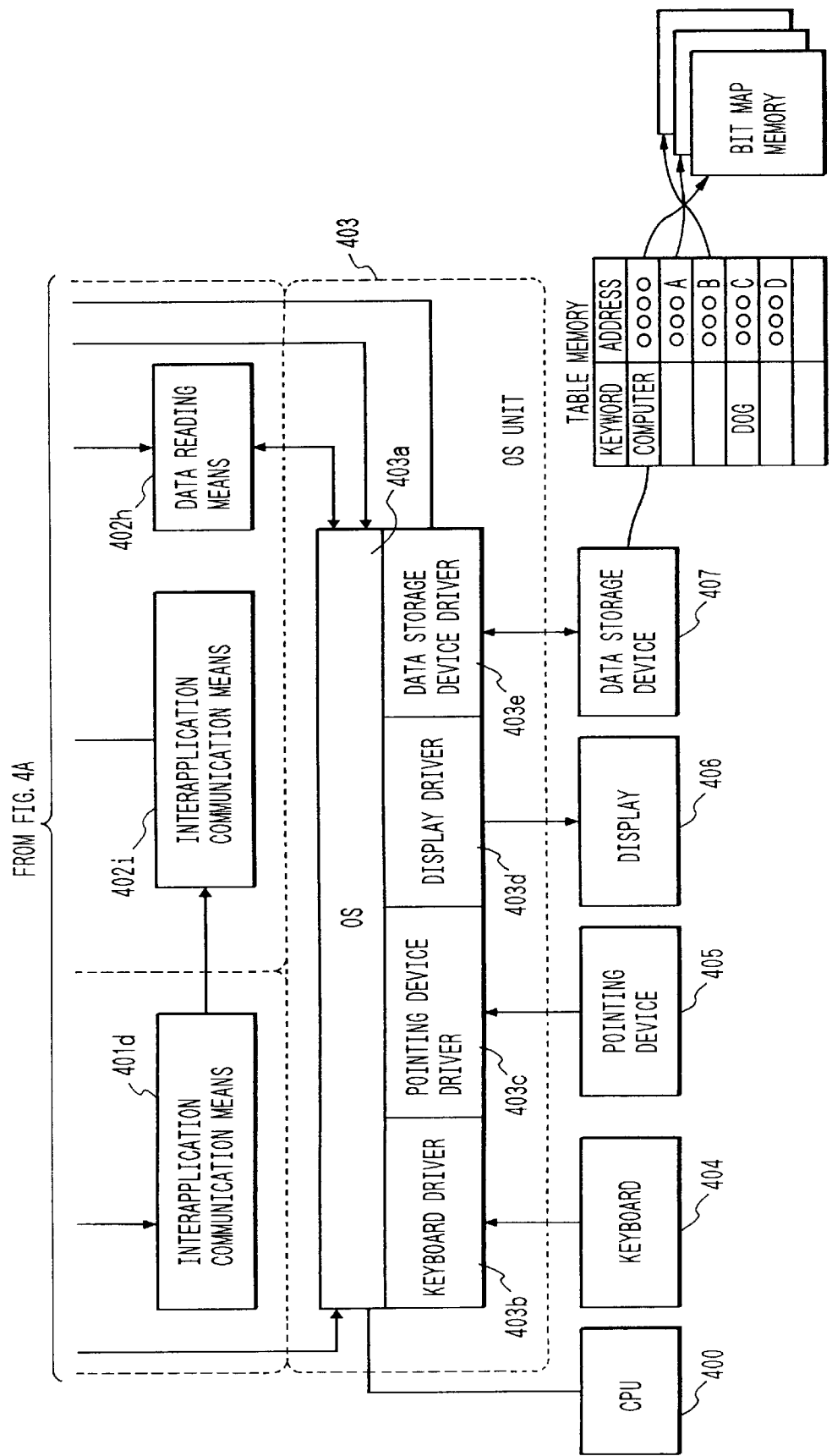
FIG. 4 which is composed of FIGS. 4A and 4B is a block diagram showing the configuration of a filing apparatus constituting a second embodiment of the present invention and a peripheral apparatus such as a word processor connected thereto.

In the following, there will be explained a second embodiment of the present invention, with reference to the attached drawings. FIGS. 4A and 4B are block diagrams showing the configuration of a filing apparatus constituting a second embodiment of the present invention.

In the filing apparatus of the present embodiment, a word processor 401 and an OS unit 403 are connected as shown in FIGS. 4A and 4B.

The OS unit 403 is same in configuration as that 103 in the first embodiment. Also, the word processor 401 and the filing apparatus 402 are same as the foregoing ones, except for a multi-media data fitting event 401b, an interapplication communication means 401d and an interapplication communication means 402i. The components same as those in the first embodiment will not be explained further.

The present embodiment utilizes DDE (dynamic data exchange), instead of the exchange of the retrieving instruction utilizing the clipboard. The details of DDE are described in the manual of the Windows.

The word processor 401 is provided with a word processor main 401a, multi-media data fitting means 401b, an OLE client 401c, and interapplication communication means 401d.

The filing apparatus 402 is provided with a user selection unit 402a, a foreground retrieving unit 402b, a multi-media data transforming unit 402c, an OLE server 402d, a selector 402e, a retrieving unit 402f, a background retrieving unit 402g, a data reading unit 402h, and interapplication communication means 402i.

The OS unit 403 is provided with an OS 303a, a keyboard driver 403b, a pointing device driver 403c, a display driver 403d, and a data storage device driver 403e.

The multi-media data fitting means 401b is composed of means of acquiring an event designating the fitting of the multi-media data from the word processor main 401a and sending the above-mentioned event to the interapplication communication means 401d.

The OLE client 401c is composed of means for calling, from the fitted object, an application managing the fitted object. In the present embodiment, the application means an image processing application, since the object is composed of an image represented by the multi-media data.

The interapplication communication means 401d is composed of means for transmitting the event, for fitting the multi-media data, to the filing apparatus 402.

The interapplication communication means 402*i* is composed of means for receiving the event for fitting the multi-media data, transmitted from the word processor 401.

The OS 403*a* of the OS unit 403 is composed of means for managing the protocol of transmission and reception between the applications and managing the device drivers, and the applications operate on this means.

Figure 5:
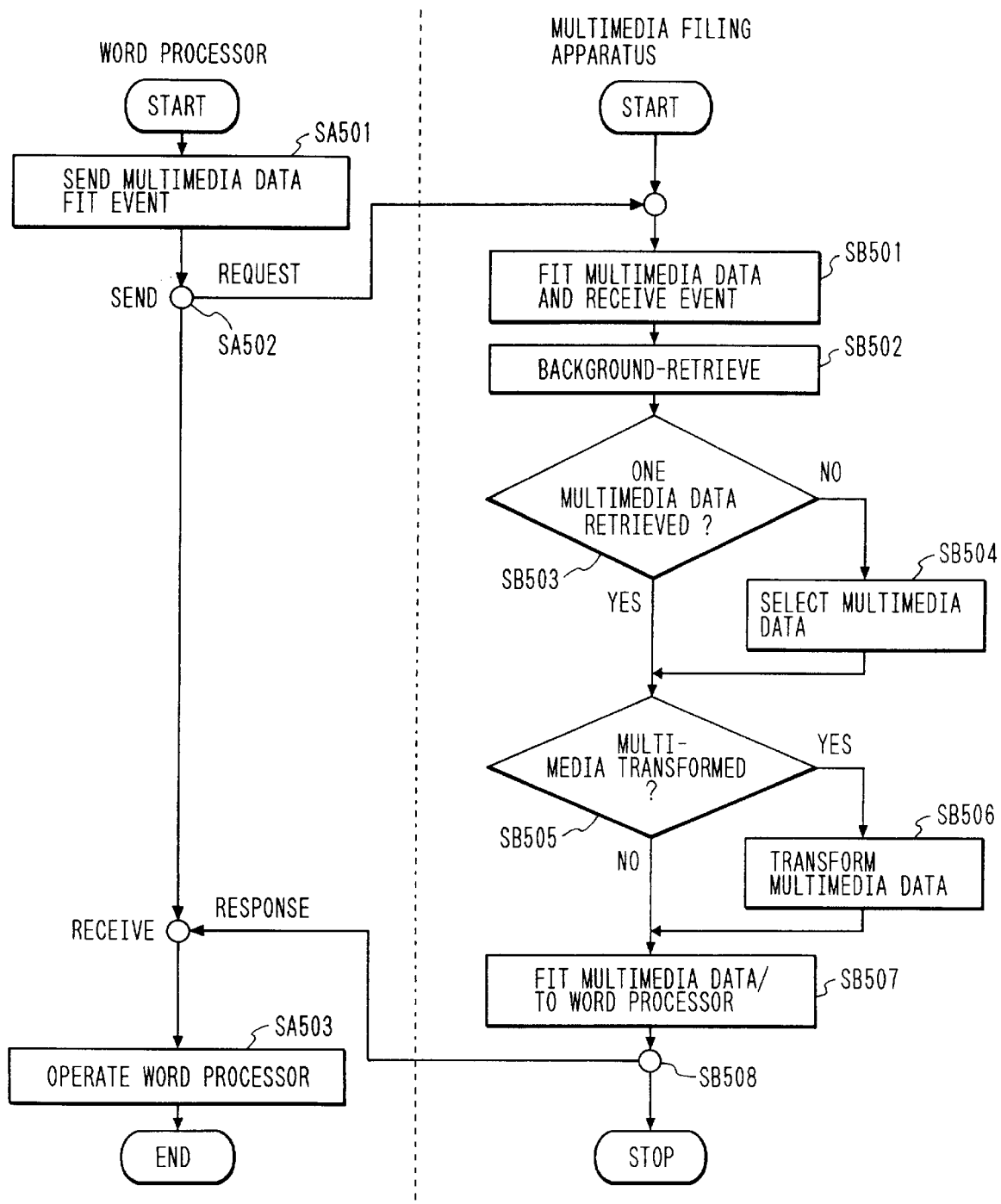
FIG. 5 is a flow chart showing the control sequence in the filing apparatus shown in FIGS. 4A and 4B.

In the following, there will be explained the sequence in the filing apparatus of the present embodiment, with reference to the attached drawings. FIG. 5 is a flow chart showing the control sequence in the filing apparatus shown in FIGS. 4A and 4B.

Referring to FIG. 5, a multi-media data fitting event and a keyword is entered by the keyboard 404 or the pointing device 405 into the word processor 401, and is requested by the interapplication communication means 401*d* to the filing apparatus 402 (steps SA501, SA502).

In response to the above-mentioned request, the filing apparatus 402 receives the multi-media data fitting event (step SB501) and effects retrieval of a file matching the keyword (step SB502).

After the retrieval as in the first embodiment, there is discriminated whether only one multi-media data or plural ones have been obtained in the retrieval (step SB503).

If plural multi-media data are obtained in the retrieval, there is displayed, on a display 406, a retrieving image frame for selecting one of the multi-media data, and the user selects the predetermined multi-media data with the pointing device 405 on the retrieving image frame on the display 406 (step SB504). The retrieving image frame and the display state are same as those in the foregoing first embodiment.

If only one multi-media data is obtained in the retrieval, or after the selection of one of the plural multi-media data, there are judged the presence or absence of a transformation process on the multi-media data and the content of such transformation process (step SB505).

The transformation process on the multi-media data is executed with the designated content (step SB506), such as enlargement, reduction, partial cutout or trimming.

After the transformation process on the multi-media data, or if the transformation process is not executed on the multi-media data, the transfer of the fitting and processing of the multi-media data to the word processor 401 is advised by a response thereto (steps SB507, SB508). After the transmission of the response, the filing apparatus 402 completes the process therein and terminates the function. In this terminated state, the filing apparatus 402 is in an idle state of the process in the background, and can execute a request from the word processor 401 as a foreground process.

After the above-mentioned response, the operation on the keyboard 404 or the pointing device 405 serves to operate the word processor 401 (step SA303).

[Third Embodiment]

In the following, there will be explained a third embodiment of the present invention, with reference to the attached drawings. The present embodiment does not utilize OLE and can operate on the Windows 3.1 or newer version or on other operating systems.

Figure 6B:
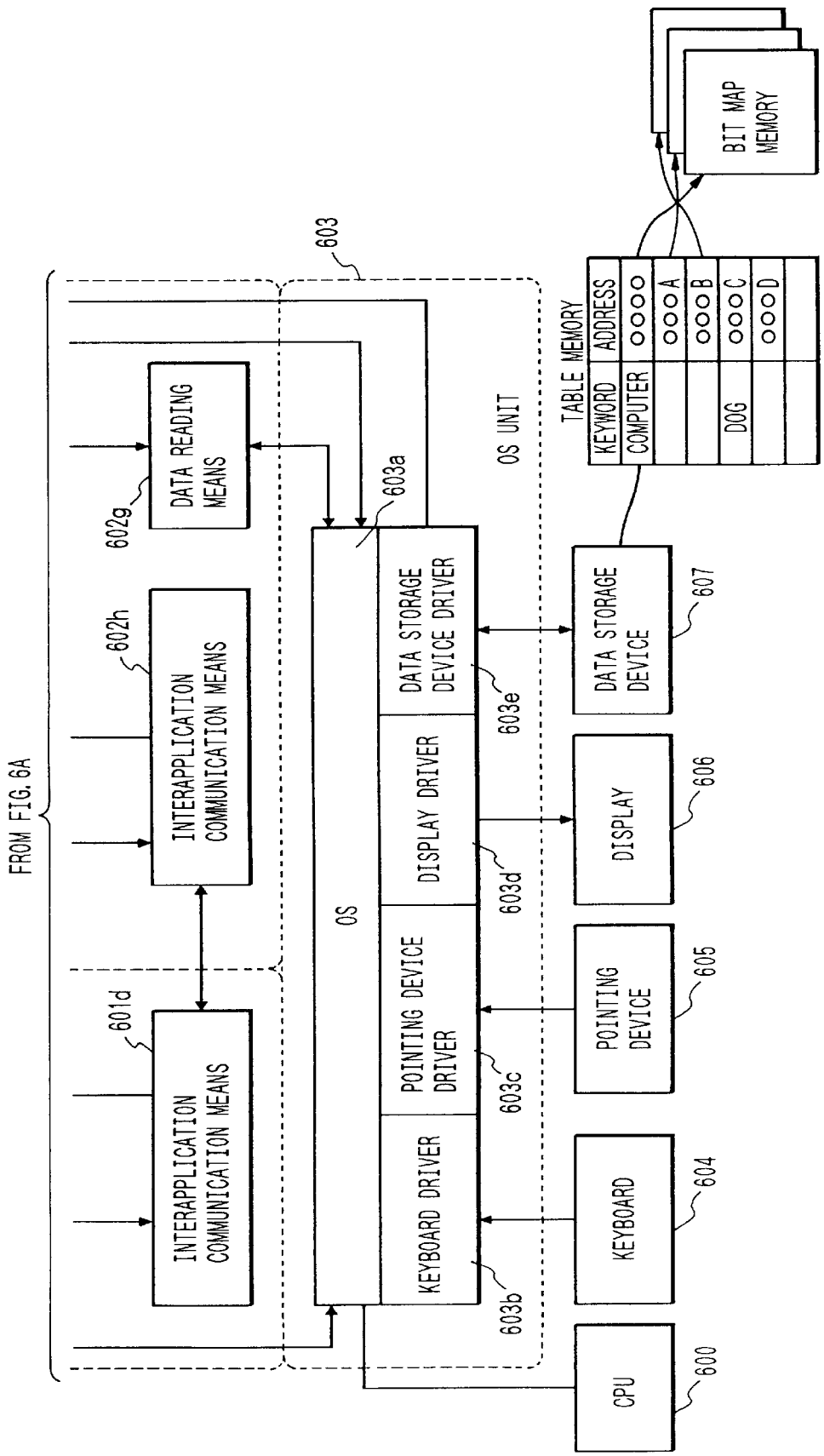
FIG. 6 which is composed of FIGS. 6A and 6B is a block diagram showing the configuration of a filing apparatus constituting a third embodiment of the present invention and a peripheral apparatus such as a word processor connected thereto.

FIGS. 6A and 6B are block diagrams showing the configuration of a filing apparatus constituting a third embodiment of the present invention and a peripheral apparatus such as a word processor connected thereto.

The filing apparatus 602 of the present embodiment is connected, as shown in FIGS. 6A and 6B, to a word processor 601 and an OS unit 603.

The word processor 601 is provided with a word processor main 601*a*, a multi-media data fitting event 601*b*, a multi-media data pasting event 601*c*, and interapplication communication means 601*d*.

The filing apparatus 602 is provided with a user selection unit 602*a*, a foreground retrieving unit 602*b*, a multi-media data transforming unit 602*c*, a selector 602*d*, a retrieving unit 602*e*, a background retrieving unit 602*f*, a data reading unit 602*g*, and an interapplication communication means 602*h*.

The OS unit 603 is provided with an OS 603*a*, a keyboard driver 603*b*, a pointing device driver 603*c*, a display driver 603*d*, and a data storage device driver 603*e*. In the following, the components of the same names as in the first embodiment are of the equivalent functions and will not be explained further.

The multi-media data fitting event 601*b* is means which is given an event for fitting the multi-media data by the keyboard 604 or the pointing device 605 in the word processor 601 and transmits this event to the interapplication communication means 601*d*.

The multi-media pasting event 601*c* is composed of means for transmitting the multi-media data after editing, supplied from the filing apparatus 602 through the interapplication communication means 601*d*, to the word processor main 601*a*.

The interapplication communication means 601*d* is composed of means for sending the multi-media data fitting event to the filing apparatus 602 and receiving the response from the filing apparatus 602 and the image after transformation, with protocols based on the OS.

The interapplication communication means 602*h* is composed of means for receiving the multi-media data fitting event 601*b* from the word processor 601 and transmitting the result thereof to the background retrieving unit 602*f*.

The OS 603*a* of the OS unit 603 is composed of means for managing the protocol of transmission and reception among applications and also managing the device drivers, and the applications operate on this means.

Figure 7:
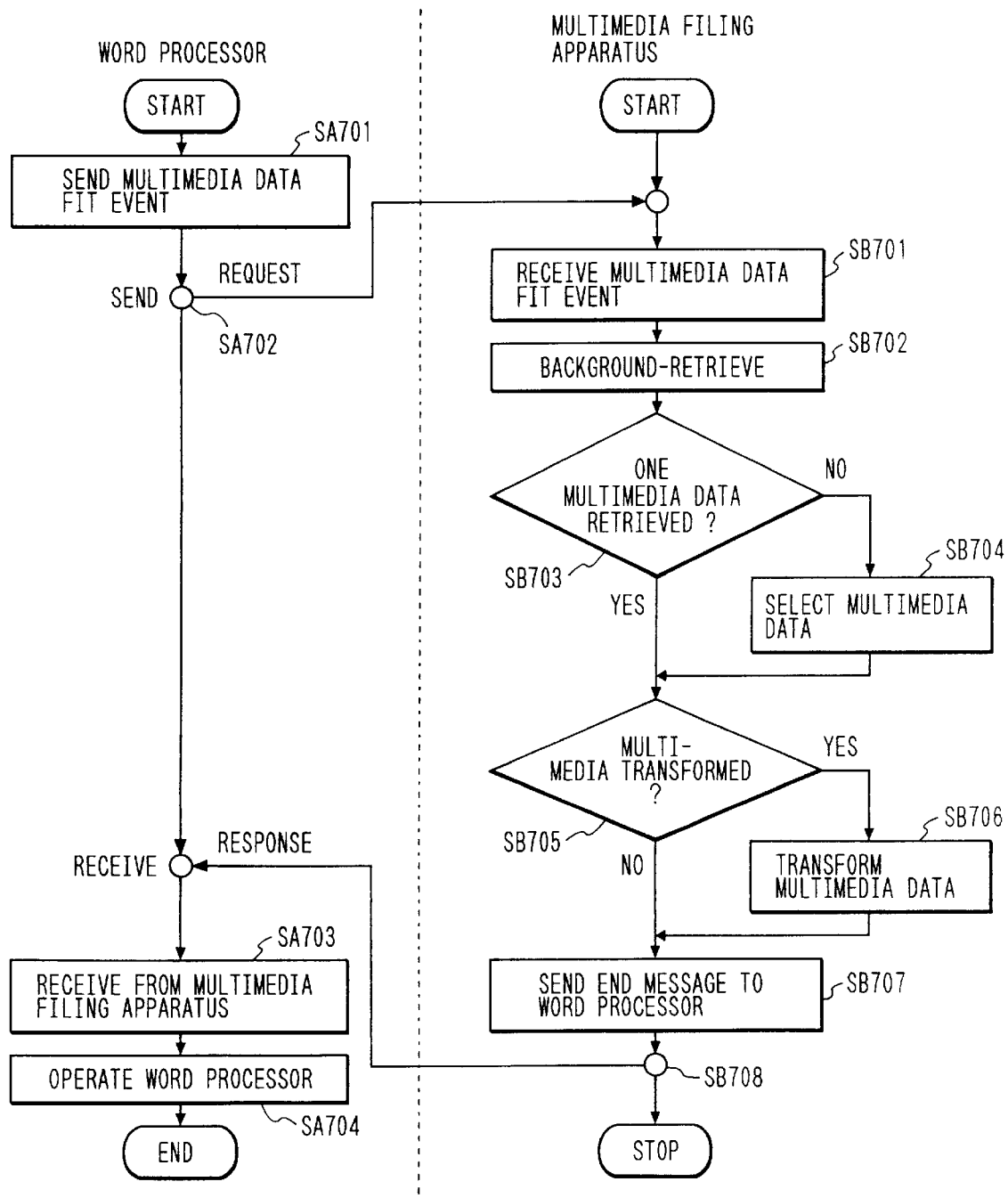
FIG. 7 is a flow chart showing the control sequence in the filing apparatus shown in FIGS. 6A and 6B.

In the following, there will be explained the functions of the filing apparatus of the present embodiment. FIG. 7 is a flow chart showing the control sequence of the filing apparatus shown in FIGS. 6A and 6B.

Referring to FIG. 7, at first a multi-media data fitting event is entered from the keyboard 604 or the pointing device 605 in the word processor 601, and is requested to the filing apparatus 602 by the interapplication communication means 601*d* (steps SA701, SA702).

In response to the request, the filing apparatus 602 receives the multi-media data fitting event (step SB701) and effects retrieval of a file matching the keyword (step SB702).

After the retrieval as in the first embodiment, there is discriminated whether only one multi-media data or plural ones have been obtained in the retrieval (step SB703).

If plural multi-media data are obtained in the retrieval, there is displayed, on a display 606, a retrieving image frame for selecting one of the multi-media data, and the user selects the predetermined multi-media data with the pointing device 605 on the retrieving image frame displayed on the display 606 (step SB704). The retrieving image frame and the display state are same as those in the foregoing first embodiment.

If only one multi-media data is obtained in the retrieval, or after the selection of one of the plural multi-media data, there are judged the presence or absence of a transformation process on the multi-media data and the content of such transformation process (step SB705).

The transformation process on the multi-media data is executed with the designated content (step SB706), such as enlargement, reduction, partial cutout or trimming.

After the transformation process on the multi-media data, or if the transformation process is not executed on the multi-media data, the transfer of the fitting and processing of the multi-media data to the word processor 601 is advised by a response thereto (steps SB707, SB708). After the transmission of the response, the filing apparatus 602 completes the process therein and terminates the function. In this terminated state, the filing apparatus 602 is in an idle state of the process in the background, and can execute a request from the word processor 601 as a foreground process.

After the word processor 601 receives the above-mentioned response (step SA703), the operation on the keyboard 604 or the pointing device 605 serves to operate the word processor (step SA704).

[Fourth Embodiment]

Figure 8:
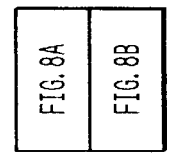
FIG. 8 which is composed of FIGS. 8A and 8B is a block diagram showing the configuration of a filing apparatus constituting a fourth embodiment of the present invention and a peripheral apparatus such as a word processor connected thereto.
Figure 8A:
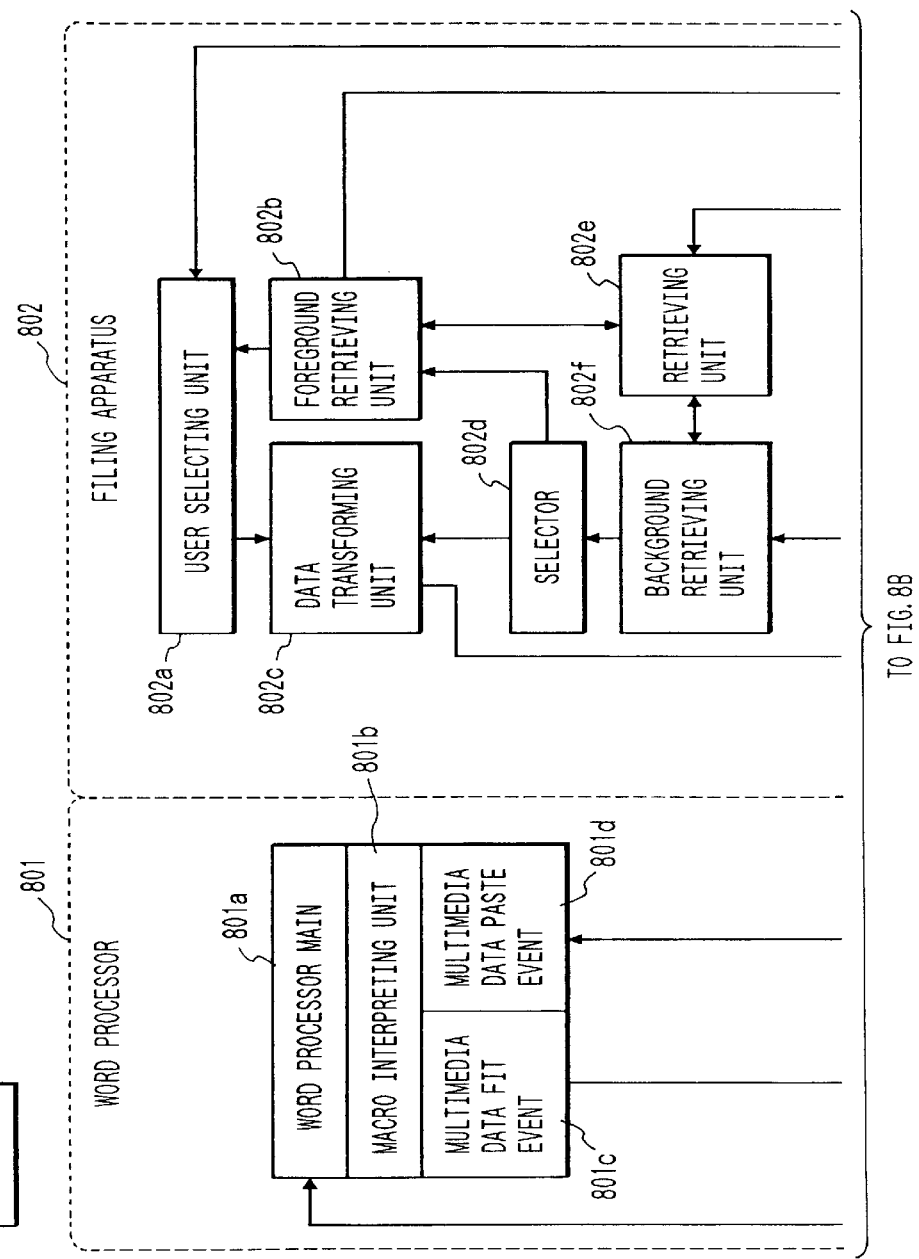

In the following, there will be explained a fourth embodiment of the present invention, with reference to the attached drawings. FIGS. 8A and 8B are block diagrams showing the configuration of a filing apparatus constituting a fourth embodiment of the present invention and a peripheral apparatus such as a word processor connected thereto.

The filing apparatus 802 of the present embodiment is connected, as shown in FIGS. 8A,and 8B to a word processor 801 and an OS unit 803.

The word processor 801 is provided with a word processor main 801*a*, a macro interpreting unit 801*b*, a multi-media data fitting event 801*c*, a multi-media data pasting event 801*d*, and an interapplication communication means 801*e*.

The filing apparatus 802 is provided with a user selection unit 802*a*, a foreground retrieving unit 802*b*, a multi-media data transforming unit 802*c*, a selector 802*d*, a retrieving unit 802*e*, a background retrieving unit 802*f*, a data reading unit 802*g*, and interapplication communication means 802*h*.

The OS unit 803 is provided with an OS 803*a*, a keyboard driver 803*b*, a pointing device driver 803*c*, a display driver 803*d*, and a data storage device driver 803*e*.

The macro interpreting unit 801*b* is composed of means for interpreting a language (simple programming language or script) supported in the word processor 801, such as Word Basic in case of the Microsoft Word for Windows. The above-mentioned macro can be a language such as Script, or a recorded method representing a sequence. This language is developed according to a protocol capable, depending on the OS, of interapplication communication.

The multi-media data fitting event 801*c* is composed of means for fetching an interpretation language extracted as the fitting event in the macro interpreting unit 801*b* and sending it to the interapplication communication means 801*e*.

The multi-media data pasting event 801*d* is composed of means for transmitting the event, sent from the filing apparatus 802 through the interapplication communication means 801*e*, to the word processor main 801*a*.

The interapplication communication means 801*e* is composed of means for transmitting the multi-media data fitting event to the filing apparatus 802 and receiving the response from the filing apparatus 802, according to a protocol based on the OS.

The background retrieving unit 802*f* is composed of means for sending a request for retrieval to the retrieving unit 802*e*, without display, on the keyword and the title provided from the word processor 801 through the interapplication communication means 802*h*.

The interapplication communication means 802*h* is composed of means for receiving the multi-media data fitting event 801*c* transmitted from the word processor 801.

The OS 803*a* of the OS unit 802 is composed of means for managing the protocol of the interapplication transmission and reception, and also managing the device drivers, and the applications operate on this means.

In the following, there will be explained the functions of the filing apparatus of the present embodiment, with reference to FIG. 9, which is a flow chart showing the sequence of the filing apparatus shown in FIGS. 8A and 8B.

Referring to FIG. 9, at first the word processor 801 effects macro interpretation and development into a protocol capable of communication (step SA901). Then, a multi-media data fitting event is transmitted to the filing apparatus 802 (step SA902), and is requested to the filing apparatus 802 by the interapplication communication means 801*d* (step SA903).

In response to the request, the filing apparatus 802 receives the multi-media data fitting event (step SB901) and effects retrieval of a file matching the keyword (step SB902).

After the retrieval as in the first embodiment, there is discriminated whether only one multi-media data or plural ones have been obtained in the retrieval (step SB903).

If plural multi-media data are obtained in the retrieval, there is displayed, on a display 806, a retrieving image frame for selecting one of the multi-media data, and the user selects the predetermined multi-media data with the pointing device 805 on the retrieving image frame displayed on the display 806 (step SB904). The retrieving image frame and the display state are same as those in the foregoing first embodiment.

If only one multi-media data is obtained in the retrieval, or after the selection of one of the plural multi-media data, there are judged the presence or absence of a transformation process on the multi-media data and the content of such transformation process (step SB905).

The transformation process on the multi-media data is executed with the designated content (step SB906), such as enlargement, reduction, partial cutout or trimming.

After the transformation process on the multi-media data, or if the transformation process is not executed on the multi-media data, the transfer of the fitting and processing of the multi-media data to the word processor 801 is advised by a response thereto (steps SB907, SB908). After the transmission of the response, the filing apparatus 802 completes the process therein and terminates the function. In this terminated state, the filing apparatus 802 is in an idle state of the process in the background, and can execute a request from the word processor 801 as a foreground process.

After the word processor 801 receives the above-mentioned response (step SA904), the operation on the keyboard 804 or the pointing device 805 serves to operate the word processor 801 (step SA905).

[Other Embodiments]

In the foregoing embodiments, in case plural multi-media data correspond to a keyword, there is employed a multi-window display as represented by 202 in FIGS. 2A and 2B, but, in such display, each image becomes small and not adequate for recognition if the number of the multimedia data corresponding to the keyword increases.

Figure 10:
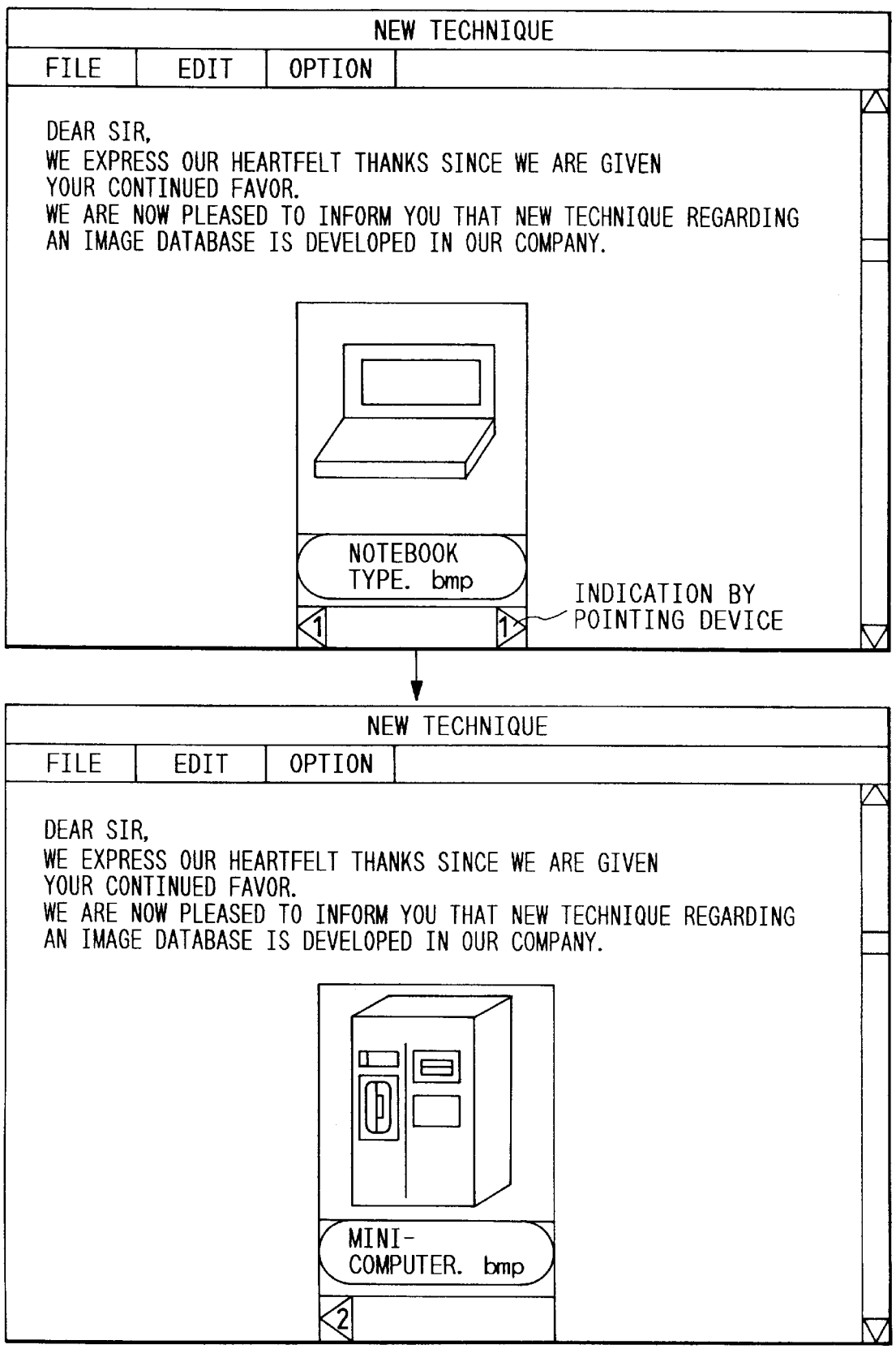
FIG. 10 is a view of another embodiment.

The facilitating the observation of the retrieving image frame, the foreground retrieving unit may be so controlled, instead of the multi-window display, as to display the unreduced multimedia data in time-sequential manner in response to the instruction from the pointing device, on the display window as shown in FIG. 10. In such case, the number of the retrieved multi-media data can be readily understood by a number displayed in a triangle mark shown in FIG. 10. Naturally, the display method of the number is not limited to the above-mentioned display in the triangle mark.

The switching to the above-mentioned display method may be set by an instruction of the user through the keyboard, or may be automatically made by the filing apparatus according to the number of data retrieved by the background retrieving unit. Thus, the multi-window display or the time-sequential display is adopted when the number of retrieved data is low or high.

Also, the multimedia data is not necessarily limited to an image but can also be a text, corresponding to the keyword, stored in the form of a bit map.

As explained in the foregoing, the filing apparatus of the present invention retrieves, by the retrieval means, multi-media data corresponding to the entered keyword, and selectively switches, according to the result of retrieval by the retrieval means, display of a retrieving image frame to be used in the retrieval of the retrieval means or fitting of the multi-media data into a text prepared by the word process. Thus, there can be achieved an improvement in the operability and in the work efficiency, in fitting the multi-media data into the prepared text data.

What is claimed is:

1. A filing apparatus capable of handling multi-media data, comprising:

retrieval means for retrieving multi-media data containing information coinciding with input information of a keyword and for determining whether the retrieved multi-media data is for one file or is for a plurality of files; and process means for, when the retrieved multi-media data is for one file, outputting said retrieved multi-media data on a display device and for, when the retrieved multi-media data is for a plurality of files, outputting a selection screen for selecting any of the retrieved multi-media data on said display device, said selection screen being an image frame in which said retrieved plural multi-media data are displayed in a multiple-window display.

2. An apparatus according to claim 1, wherein the multi-media data has been stored in a hard disc, an optical disc or a floppy disc.

3. An apparatus according to claim 1, further comprising:

instruction means for selectively instructing an arbitrary file from the plurality of files.

4. An apparatus according to claim 1, wherein the multi-media data is image data and wherein the selection screen displays an image obtained by reducing the image data.

5. An apparatus according to claim 1, further comprising selection instructing means for selectively instructing an arbitrary file from the plurality of files, wherein said selection instructing means changes a display status relating to the multi-media data selected in the selection screen according to an instruction by said selection instructing means.

6. A filing apparatus capable of handling multi-media data, comprising:

retrieval means for retrieving multi-media data containing information coinciding with input information of a keyword and for determining whether the retrieved multi-media data is for one file or is for a plurality of files; and process means for, when the retrieved multi-media data is for one file, outputting said retrieved multi-media data on a display device, and for, when the retrieved multi-media data is for a plurality of files, outputting a selection screen for selecting any of the retrieved multi-media data on said display device, said selection-screen being an image frame in which said retrieved plural multi-media data are displayed in a time-sequential manner.

7. A filing apparatus according to claim 6, wherein said selection screen also displays the number of files of the retrieved multi-media data.

8. An apparatus according to claim 6, wherein the multi-media data has been stored in a hard disc, an optical disc or a floppy disc.

9. An apparatus according to claim 6, further comprising:

instruction means for selectively instructing an arbitrary file from the plurality of files.

10. An apparatus according to claim 6, further comprising selection instructing means for selectively instructing an arbitrary file from the plurality of files, wherein said selection instructing means changes a display status relating to the multi-media data selected in the selection screen according to an instruction by said selection instructing means.

11. A filing method for handling multi-media data, comprising the steps of:

retrieving multi-media data containing information coinciding with input information of a keyword;

determining whether the retrieved multi-media data is for one file or is for a plurality of files;

when the retrieved multi-media data is for one file, outputting said retrieved multi-media data on a display device, and when the retrieved multi-media data is for a plurality of files, outputting a selection screen for selecting a of the retrieved multi-media data on said display device, said selection screen being an image frame in which said retrieved plural multi-media data are displayed in a multiple-window display.

12. A method according to claim 11, wherein said filing method is used by software which starts on an operating system.

13. A method according to claim 11, wherein the retrieved multi-media data is used in a software process which starts on an operating system starting a software process corresponding to the filing method.

14. A method according to claim 11, wherein the retrieved multi-media data is used in a word processing software process which starts on an operating system starting a software process corresponding to the filing method.

15. A method according to claim 11, wherein the retrieved multi-media data is linked to a software process which starts on an operating system starting a software process corresponding to the filing method and used by the software.

16. A method according to claim 11, wherein said retrieving is instructed by a communication between applications from another software.

17. A method according to claim 11, wherein the retrieving starts according to a request for embedding the multi-media data obtained by the retrieving into data prepared by another software.

18. A filing method for handling multi-media data, comprising the steps of:

retrieving multi-media data containing information coinciding with input information of a keyword:

determining whether the retrieved multi-media data is for one file or is for a plurality of files;

when the retrieved multi-media data is for one file, outputting said retrieved multi-media data on a display device, and when the retrieved multi-media data is for a plurality of files, outputting a selection screen for selecting any of the retrieved multi-media data on said display device, said selection screen being an image frame in which said retrieved plural multi-media data are displayed in a time-sequential manner.

19. A filing method according to claim 18, wherein said selection screen also displays the number of files of the retrieved multi-media data.

20. A method according to claim 18, wherein said filing method is used by software which starts on an operating system.

21. A method according to claim 18, wherein the retrieved multi-media data is used in a software process which starts on an operating system starting a software process corresponding to the filing method.

22. A method according to claim 18, wherein the retrieved multi-media data is used in a word processing software process which starts on an operating system starting a software process corresponding to the filing method.

23. A method according to claim 18, wherein the retrieved multi-media data is linked to a software process which starts on an operating system starting a software process corresponding to the filing method and used by the software.

24. A method according to claim 18, wherein said retrieving is instructed by a communication between applications from another software.

25. A method according to claim 18, wherein the retrieving starts according to a request for embedding the multi-media data obtained by the retrieving into data prepared by another software.

* * * * *

UNITED STATES PATENT AND TRADEMARK OFFICE
CERTIFICATE OF CORRECTION

PATENT NO. : 5,995,090
DATED : November 30, 1999
INVENTOR(S) : Mamiya et al.

It is certified that error appears in the above-identified patent and that said Letters Patent is hereby corrected as shown below:

ON THE TITLE PAGE

Under Item [56] REFERENCES CITED, U.S. PATENT DOCUMENTS :

| | | |
|---|---|---|
| After "5,572,728 | 11/1996 | Tada et al" delete "707/200" and insert therefor -- 395/616 --. |
| After "5,581,686 | 12/1996 | Koppolu et al" delete "345/340" and insert therefor -- 395/340 --. |
| After "5,613,909 | 3/1997 | Stelovsky" delete "463/1" and insert therefor -- 463/3 --. |
| After "5,640,579 | 6/1997 | Koppolu et al" delete "707/526" and insert therefor -- 395/788 --. |
| After "5,659,793 | 8/1997 | Escobar et al" delete "345/302" and insert therefor -- 395/807 --. |

Insert -- 5,517,605   5/199   Wolf   395/155 --.

Under OTHER PUBLICATIONS, insert:

Cowert, Mastering Windows 3.1, p. 28-30, 1993

IN THE SPECIFICATION

Col. 3, line 38, delete "105a" and insert therefore -- 105 --.

Col. 12, line 29, after "selecting" delete "a" and insert -- any --.

Signed and Sealed this

Tenth Day of April, 2001

*Attest:*

NICHOLAS P. GODICI

*Attesting Officer*   Acting Director of the United States Patent and Trademark Office